United States Patent [19]

Bozer et al.

[11] 3,816,375

[45] June 11, 1974

[54] METHOD FOR CURING A PREPOLYMERIZED FURAN BINDER

[75] Inventors: Keith B. Bozer; Lloyd H. Brown, both of Crystal Lake, Ill.

[73] Assignee: The Quaker Oats Company, Chicago, Ill.

[22] Filed: Jan. 31, 1972

[21] Appl. No.: 222,336

[52] U.S. Cl............ 260/67 FA, 260/67 F, 260/88.5
[51] Int. Cl......................... C08g 1/12, C08g 23/02
[58] Field of Search....................... 260/67 F, 67 FA

[56] References Cited
UNITED STATES PATENTS 2,345,966  4/1944  Fiedler et al.................. 260/67 FA
2,499,275  2/1950  McWhorter..................... 260/67 FA
3,594,345  7/1971  Brown et al................ 260/67 FA X
3,700,604  10/1972 Metil.......................... 260/67 FA X Primary Examiner—Lucille M. Phynes
Attorney, Agent, or Firm—Joseph P. O'Halloran; Grace J. Fishel

[57] ABSTRACT

This invention relates to a process for curing a partially perpolymerized furfuryl alcohol-aldehyde binder with a specified acid salt of an aromatic amine, said binder useful for example in the preparation of fiber glass laminates.

4 Claims, No Drawings

METHOD FOR CURING A PREPOLYMERIZED FURAN BINDER

BACKGROUND OF THE INVENTION

Furan binders prepared from furfuryl alcohol and an aldehyde have long been known for their excellent corrosion resistant properties, A. P. Dunlop and F. N. Peters, The Furans, Chapter 18, American Chemical Society Monograph series, Reinhold Publishing Corporation, New York, 1953. However, the practical utilization of these binders with conventional polymerization catalysts such as mineral acid catalysts, e.g., sulfuric acid, hydrochloric acid, etc., has been plagued with processing difficulties. These difficulties include excessive exotherm and short pot life.

The above difficulties are partially overcome by use of a binder wherein the furfuryl alcohol has been prepolymerized with the aldehyde. One such binder especially adapted to fiber glass laminates is described in U.S. Pat. No. 3,594,345. Use, however, of this binder and partially prepolymerized furfuryl alcohol binders in general with conventional polymerization catalysts still gives rise to excessive exotherm and too short pot life.

Use of "latent" or "placid" polymerization catalysts with furfuryl alcohol binders to control exotherm and extend pot life is well known. One example of such teaching is U.S. Pat. No. 2,345,966 wherein the mineral acid salts of nitrogen containing organic compounds including amines such as aniline, etc., are taught as suitable "placid" polymerization catalysts.

Polymerization of partially prepolymerized furfuryl alcohol-aldehyde binders with "placid" catalysts such as aniline hydrochloride still results in excessive exotherms and too short pot lives for some applications. Hence, there is a need for a better "placid" catalyst than heretofore available.

SUMMARY OF THE INVENTION

It is an object of this invention to provide an improved method for curing partially prepolymerized furfuryl alcohol-aldehyde binders wherein the exotherm is controlled and the pot life is extended.

The objects of this invention are accomplished by a method for curing a prepolymerized furfuryl alcohol binder comprising furfuryl alcohol and an aldehyde wherein the improvement comprises: admixing with said prepolymerized furfuryl alcohol binder a catalyst which is a reaction product of an acid selected from the group consisting of mineral acid and sulfonic acid, and an aromatic amine of the formula:

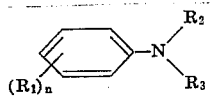

wherein $n$ is 0 to 5 inclusive, $R_1$ is chlorine, bromine, iodine or an alkyl group having 1 to 4 carbon atoms inclusive; when $n$ is 1 to $R_1$ may additionally be

when $n$ is 2 to 5 inclusive men two groups of $R_1$ which are ortho to each other may additionally be joined to form a benzene ring which is substituted with $(R_4)_m$ wherein $m$ is 0 to 4 inclusive; and $R_2$, $R_3$, and $R_4$ are independently hydrogen or an alkyl group having 1 to 4 carbon atoms with the further proviso that $n$ is not 0 when $R_2$ and $R_3$ are both hydrogen. The catalyst should be present in an amount between 1 and 10 percent by weight based on the weight of the binder composition.

It is to be understood that by partially prepolymerized furfuryl alcohol-aldehyde binder we mean that furfuryl alcohol has been resinified with an aldehyde such as formaldehyde, furfural, or mixtures thereof. The resinification of furfuryl alcohol is readily accomplished in the presence of an acid catalyst. Numerous catalysts may be employed to accomplish the resinification. Suitable catalysts include for example inorganic and organic acids such as hydrochloric acid, sulfuric acid, nitric acid, orthophosphoric acid, benzene sulfonic acid, toluene sulfonic acid, napthalene sulfonic acid, benzoic acid, salicyclic acid, acetic acid, propionic acid, maleic acid, oxalic acid, malonic acid, phthalic acid, lactic acid, and citric acid. Suitable acid catalysts also include Friedel-Crafts type catalysts such as ferric chloride, aluminum chloride, zinc chloride, and ammonium chloride. Suitable acid catalysts include organic acid anhydrides such as maleic anhydride, succinic anhydride, and glutaric anhydride. Examples of satisfactory conventional acid catalysts include mineral acid salts of urea, thiourea, substituted ureas such as methyl ureas, acetyl urea, benzoyl urea, phenyl thiourea, etc.; mineral acid salts of other members of the urea system, e.g., guanidine, creatine, guanoline, etc.; mineral salts of ethanol amines such as mono-, di-, and tri-ethanolamine; and mineral acid, salts of amines such as methyl amine, tri-methyl amine, aniline, benzylamine, morpholine, etc.

The resinification is generally stopped at an intermediate fluid stage, i.e., a viscosity at 26° C. between 300 and 5,000 centipoises, by the neutralization of the catalyst with a base to adjust the acidity. Within the range pH 5-8, the liquid resin is stable in storage for extended periods, and at the time of use, is recatalyzed with the above mentioned salts of the specified aromatic amines.

Optionally the acid resinification may be permitted to process further. If the prepolymerized furfuryl alcohol-aldehyde binder is too viscous to be worked, e.g., having a viscosity between 10,000 and 200,000 centipoises at 26° C. monomeric furfural may be added after the catalyst is neutralized to produce a prepolymerized furfuryl alcohol-aldehyde binder having a viscosity between 300 and 5,000 centipoises at 26° C.

Formaldehyde if present in the binder should be in the ratio 0.25 to 1.0 mole per mole of furfuryl alcohol. Furfural if present in the binder should comprise 5 to 25 percent by weight of the partially prepolymerized furfuryl alcohol-aldehyde binder.

The novelty of our invention lies chiefly in the use of the above specified acid salts as catalysts in the curing of partially prepolymerized furfuryl alcohol-aldehyde binders. These acid salts unexpectedly provide cures with lower exotherms and longer pot lives. The acid salts used in this invention may be used in combination with the prior art acid catalysts when a shorter cure time is desired and the exotherm is controlled by cooling or can be tolerated.

Examples of acids which may be used in preparing the acid salts employed in our invention are the mineral acids, e.g., hydrochloric acid, hydrobromic acid, and hydroiodic acid; phosphoric acid, sulfuric acid, and nitric acid; and the sulfonic acids, e.g., benzene sulfonic acid, toluene sulfonic acid, and naphthalene sulfonic acid. These acids are reacted with an aromatic amine of the above formula. From about 50 percent to about 200 percent of the theoretical amount of acid necessary to neutralize the amine has been found satisfactory.

Suitable aromatic amines of the above formula for example include the following:

a. Where $R_1$ is an alkyl group having 1 to 4 carbon atoms, inclusive, and $R_2$ and $R_3$ are hydrogen,
toluidine (o, m, and p)
dimethylaniline (2,4- and 2,6-)
ethylaniline (o, m, and p)
diethylaniline (2,4- and 2,6-)
n-propylaniline (o, m, and p)
isopropylaniline (o, m, and p)
di-n-propylaniline (2,4- and 2,6-)
diisopropylaniline (2,4- and 2,6-)
butylaniline (o, m, and p)
sec-butylaniline (o, m, and p)
t-butylaniline (o, m, and p)
dibutylaniline (2,4- and 2,6-)
di-sec-butylaniline (2,4- and 2,6-)
di-t-butylaniline (2,4- and 2,6-)

b. Where $R_1$ is hydrogen, $R_2$ is an alkyl group having 1 to 4 carbon atoms inclusive and $R_3$ is hydrogen or $R_2$,
N-ethylaniline
N,N-diethylaniline
N-isopropylaniline
N,N-diisopropylaniline
N-isobutylaniline
N,N-diisobutylaniline
N,t-butylaniline c. Where $R_1$ is an alkyl group having 1 to 4 carbon atoms inclusive, $R_2$ is $R_1$, and $R_3$ is hydrogen or $R_1$, N-ethyl-o-toluidine
N,N-diethyl-o-toluidine
N-propyl-o-toluidine
N,N-dipropyl-o-toluidine
N-ethyl-n-toluidine
N-sec-butyl-o-toluidine
N,N-di-sec-butyl-o-toluidine
N,N-diethyl-m-toluidine
N-isopropyl-m-toluidine
N,N-diisopropyl-m-toluidine
N-sec-butyl-m-toluidine
N,N-di-sec-butyl-m-toluidine
N-ethyl-p-toluidine
N,N-diethyl-p-toluidine
N-isopropyl-p-toluidine
N,N-diisopropyl-p-toluidine
N-sec-butyl-p-toluidine
N,N-di-sec-butyl-p-toluidine
N-ethyl-o-ethylaniline
N,N-diethyl-o-ethylaniline
N-isopropyl-o-ethylaniline
N,N-diisopropyl-o-ethylaniline
N-sec-butyl-o-ethylaniline
N,N-di-sec-butyl-o-ethylaniline d. Where two groups of $R_1$ are ortho to each other and are joined to form a benzene ring,
1-naphthylamine
2-naphthylamine
1,8-naphthalenediamine e. Where $R_1$ is

and $R_2$ and $R_3$ are hydrogen or alkyl group having 1 to 4 carbon atoms inclusive, phenylenediamine (o, m, and p)

f. Where $R_1$ is chlorine, bromine or iodine and $R_2$ and $R_3$ are hydrogen,
Chloroaniline (o, m, and p)
bromoaniline (o, m, and p)
iodoaniline (o, m, and p)
dichloroaniline (2,4- and 2,6-)
dibromoaniline (2,4- and 2,6-)
diiodoaniline (2,4- and 2,6-)
trichloroaniline (2,4,6-)
tribromoaniline (2,4,6-)
triiodoaniline (2,4,6-)

The acid salts useful in our invention may be added as solids or in the form of solutions to the partially prepolymerized furfuryl alcohol-aldehyde binder. It will be recognized that the catalyst might be added to the material to be bound and the binder than applied. To facilitate uniform distribution of the catalyst we prefer to admix the catalyst and binder and then apply this admixture to the material to be bound. Suitable solvents include water, methanol, and ethanol. It is preferred that the solution be concentrated inasmuch as it is undesirable to have unreactive and vaporizable material present in the unpolymerized binder.

Cure may take place at ambient temperature or may be accelerated by heating the catalyst and binder composition admixture to the initiation temperature of the particular acid salt of the substituted aromatic amine selected. The initiation temperature is that temperature where the heat of polymerization causes the catalyzed binder composition admixture to be at a higher temperature than that of an uncatalyzed binder composition subjected to identical programmed increases in temperature of a constant rate.

Partially prepolymerized furfuryl alcohol-aldehyde binders catalyzed by the method of this invention may be used in the formation of a wide range of composites. Suitable material for the formation of composites includes sand and fiber glass. It is to be understood that by "fiber glass" we mean all of the conventional forms used for reinforcement in standard fiber glass reinforced plastics. Suitable materials include for example chopped strand mat, woven roving, surfacing mat, chopped glass fiber, glass cloth, etc.

When the material selected for the composite is fiber glass we prefer to use a prepolymerized furfuryl alcohol-aldehyde binder which consists of a homogeneous mixture of:

A. a furfuryl alcohol-formaldehyde resin having a viscosity between 5,000 and 200,000 centipoises at 77° F., said resin having been prepared by the steps of acid resinification of furfuryl alcohol and formaldehyde in a molar ratio of between 0.25 and 1.0 moles of formaldehyde per mole of furfuryl alcohol, neutralizing the catalyst, and removing substantially all the water by distillation; and B. furfural in an amount between 5 and 25 percent by weight based on the weight of the binder composition, said binder composition having a viscosity between 300 and 5,500 centipoises at 77° F.

The fiber glass laminates prepared by the process of our invention have high structural strength, high chemical resistance, and fire resistance. They are substantially blister free and are useful wherever resistance to heat or chemicals and strength are important. For example, they are useful in industries where corrosion problems are severe including the chemical fertilizer, dairy, waste treatment, and paper industries. Other applications include use in equipment used for storage, processing, and transfer of bulk materials and use in hoods, ducts, stacks, and scrubbers associated with exhaust systems which require a high degree of corrosion resistance and thermal stability.

DESCRIPTION OF THE PREFERRED EMBODIMENTS

The following examples are shown for the purpose of illustrating and demonstrating the invention. It will be apparent to those skilled in the art that various changes and modifications may be made therein without departing from the spirit and scope of the invention as it is more precisely defined in the subjoined claims.

EXAMPLE 1

This example is intended to illustrate a method of preparing the resin described in U.S. Pat. No. 3,594,345 for use in accordance with this invention: 198 parts by weight of furfuryl alcohol, 40.7 parts by weight of a solution consisting of 39 parts by weight of formaldehyde, 12 parts by weight of methanol, 49 parts by weight of water, and 0.78 parts by weight of a solution consisting of 10 parts by weight of oxalic acid in 90 parts by weight of water, were mixed at room temperature in a 15-gallon stainless steel kettle equipped with a steam jacket, thermometer well, and reflux condenser. The pH of the resulting solution measured 1.95. The batch was heated over a period of 60 minutes to a temperature of 90° C., at which point reflux began. At this point the hot cup viscosity as measured by a Cenco consistency cup No. 27145 was 37 seconds. The batch refluxed at 98°–100° C. until the hot cup viscosity was about 41 seconds. The resin was immediately neutralized 0.39 parts by weight of triethanolamine and cooled. The pH was 6.2. The batch was distilled at temperatures up to 120° C. and pressures down to 50 mm. of mercury. The viscosity of the resin at 25° C. was then 12,000 centipoises. After dillution with 28 parts by weight of furfural, a viscosity of 400 centipoises was obtained.

EXAMPLE 2

Using the laminating resin prepared above, two fiber glass laminates were prepared as follows: A long sheet of polyethylene terephthalate was laid out on a flat working surface. One percent by weight of N,N'-bis[(triethoxy)silylpropyl]-1,4-xylene-$\alpha,\alpha'$-diimine based on the weight of the resin was added to the resin prepared above. The resin was then catalyzed with 6 percent by weight based on the weight of the resin of a catalyst solution and was applied to a sheet of glass cloth which had been heat cleaned. The catalyst solution was 50 percent by weight of N-ethylaniline hydrochloride in water. The glass cloth was worked into the wet resin using a conventional resin roller. The steps of spreading the resin, laying a sheet of glass cloth, and rolling the resin was repeated four more times to provide a 6-ply laminate. A thin top layer of resin was added to the uppermost resin wetted glass cloth. The laminate was cured for 16 hours at about 27° C. and then for 3 hours at 180° F. The measured physical properties of the laminate are reported below in Table I.

TABLE I

| Test No. | Flexural Strength (psi) | Modulus (psi) | % elongation |
|---|---|---|---|
| 1 | 41,788 | 1,304,048 | 3.19 |

The above flexural strength, modulus, and elongation were measured with an Instron Tester Model TT-D. The fluxural strength was determined by ASTM D–790 and the percent elongation was calculated as the maximum outer fiber strain.

The fiber glass laminate produced in this example was substantially blister free indicating success in controlling the exotherm. If the exotherm had not been controlled the water produced during polymerization would have been excessively vaporized causing the laminate to be blistered and weakened by the splitting of the laminate layers. As shown above the laminate of this example had high structural strength.

EXAMPLE 3

Using the laminating resin prepared in Example 1, Tests 2–15 inclusive were prepared. The principal purpose of these tests is to show that the specified acid salts of the above described aromatic amines can control the gel time of the laminating resin. For example, gel time may range from 8 minutes to more than 5 days (>7,500 minutes) at the 4 percent catalyst level as shown in Table II. By proper choice of catalyst and catalyst level, almost any desired cure cycle can be attained. The initiation temperatures reported in Table III are related to catalyst activity and reflect the temperature at which the catalyst initiates rapid polymerization. These values were determined by heating the test sample at a programmed rate and recording the temperature at which the heat of polymerization caused deviation from the programmed heating rate.

The gel time given in Table II indicates that gel time is generally related to the catalyst level as might be expected. The gel time was that point when the binder was sufficiently polymerized that it would not flow when tilted and when touched would no longer transfer to the finger. These two conditions usually coincided. Gel time is a measure of pot life.

Tests 2–15 were prepared by adding the amount and type of catalyst indicated in Tables II and III, inclusive, below. Tests 3–15 inclusive are embodiments of our invention. Test 2 is not an embodiment of our invention but was prepared for the purpose of comparing with Tests 3–15 inclusive.

TABLE II

Gel Time in Minutes at 28° C.

Test　　　　　　　　　　　　　　Time at Catalyst Level

| No. | Catalyst | 3% | 4% | 6% | 8% |
|---|---|---|---|---|---|
| 2 | Aniline Hydrochloride | 7 | 5 | 3 | 2 |
| 3 | N-Methylaniline Hydrochloride | 31 | 23 | 16 | 10 |
| 4 | N-Ethylaniline Hydrochloride | 41 | 20 | 14 | 8 |
| 5 | N-Isopropyl aniline Hydrochloride | — | 93 | >60 | 70 |
| 6 | N,N-Dimethyl aniline Hydrochloride | — | 11000 | — | 960 |
| 7 | N,N-Diethyl aniline Hydrochloride | — | >7500 | >7500 | >7500 |
| 8 | o-Ethylaniline Hydrochloride | >240 | 220 | 35 | 18 |
| 9 | 2,3-Dimethyl aniline Hydrochloride | >120 | — | 170 | 70 |
| 10 | 2-Methyl-6-ethylaniline Hydrochloride | 125 | 70 | 36 | 25 |
| 11 | 2,6-diisopropyl aniline Hydrochloride | — | 285 | 210 | 150 |
| 12 | Tribromoaniline Hydrochloride | — | 47 | — | 12 |
| 13 | N-Ethylaniline Hydrobromide | 50 | 30 | — | 7 |
| 14 | o-Phenylene diamine Monohydrochloride | — | >240 | — | 80 |
| 15 | o-Phenylenediamine Dihydrochloride | — | 8 | — | 4 |

TABLE III

Initiation Temperatures as a Function of Catalyst Type at the 3 Percent Level

| Test No. | Catalyst | Temperature °F. |
|---|---|---|
| 2 | Aniline Hydrochloride | 63 |
| 3 | N-Methylaniline Hydrochloride | 97 |
| 4 | N-Ethylaniline Hydrochloride | 100 |
| 5 | N-Isopropylaniline Hydrochloride | 127 |
| 6 | N,N-Dimethylaniline Hydrochloride | 195 |
| 7 | N,N-Diethylaniline Hydrochloride | 228 |
| 8 | o-Ethylaniline Hydrochloride | 160 |
| 9 | 2,3-Dimethylaniline Hydrochloride | 165 |
| 10 | 2-Methyl-6-ethylaniline Hydrochloride | 97 |
| 11 | 2,6-Diiospropylaniline Hydrochloride | 150 |
| 12 | Tribromoaniline Hydrochloride | 175 |
| 13 | N-Ethylaniline Hydrobromide | 140 |
| 14 | o-Phenylenediamine Monohydrochloride | 218 |
| 15 | o-Phenylenediamine Dihydrochloride | 75 |

The superior properties of the acid salts in Tests 3–15 inclusive as catalysts as evidenced by extended gel time over aniline hydrochloride in Test 2 is not predictable on the basis of $pK_a$. Part of the data tabulated in Tables II and III is retabulated in Table IV below to demonstrate the lack of correlation with $pK_a$.

TABLE IV

| Amine | $pK_a$ | Gel Time at 4% Level | Initiation Temperature at 3% Level |
|---|---|---|---|
| o-phenylenediamine | 4.37 at 21°C. | >240 | 218 |
| aniline | 4.63 at 25°C. | 5 | 63 |
| N-methylaniline | 4.85 at 25°C. | 23 | 97 |
| N-ethylaniline | 5.12 at 24°C. | 20 | 100 |
| N,N-dimethylaniline | 5.15 at 25°C. | 11000 | 195 |
| N,N-diethylaniline | 6.16 at 22°C. | >7500 | 228 |

EXAMPLE 4

The orthophosphoric acid and p-toluene sulfonic acid salts of aniline; N-methylaniline; N-ethylaniline; N-isopropylaniline; N,N-dimethylaniline; N,N-diethylaniline; o-ethylaniline; 2,3-dimethylaniline; 2-methyl-6-ethylaniline; 2,6-diisopropylaniline; tribromoaniline; N-ethylaniline; and the mono and di- acid derivative of o-phenylenediamine were prepared and are used at the 4% catalyst level in the laminating resin prepared in Example 1. The salts of aniline had a shorter gel time and a greater exotherm than the other aromatic amines in this example. The use of the aniline salts does not constitute an embodiment of our invention but was tried for purposes of comparison.

From the foregoing description we consider it to be clear that the present invention contributes a substantial benefit to furan binder art.

We claim:

1. In a method for curing a prepolymerized furfural alcohol binder prepolymerized by acid catalyzed polymerization, said binder comprising furfuryl alcohol and an aldehyde selected from the group consisting of formaldehyde and furfural, wherein formaldehyde is present in the ratio 0.25 to 1 mole per mole of furfuryl alcohol, or furfural comprises 5 to 25 percent by weight of said binder, the improvement consisting of: admixing with said prepolymerized furfuryl alcohol binder a catalyst which is a reaction product of an acid selected from the group consisting of mineral acid and sulfonic acid and an aromatic amine of the formula:

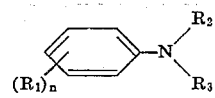

wherein $n$ is 0 to 5 inclusive; $R_1$ is chlorine, bromine, iodine or an alkyl group having 1 to 4 carbon atoms inclusive; when $n$ is 1 then $R_1$ may additionally be

when $n$ is 2 to 5 inclusive then two groups of $R_1$ which are ortho to each other may additionally be joined to form a benzene ring which is substituted with $(R_4)_m$ wherein $m$ is 0 to 4 inclusive; and $R_2$, $R_3$, and $R_4$ are independently hydrogen or an alkyl group having 1 to 4 carbon atoms with the further proviso that $n$ is not 0 when $R_2$ and $R_3$ are both hydrogen; said catalyst being in an amount between 1 percent and 10 percent by weight based on the weight of the binder composition.

2. The process as in claim 1 wherein the catalyst is a member selected from the group consisting of N-methylaniline hydrochloride, N-ethylaniline hydrochloride, N-isopropylaniline hydrochloride, N,N-dimethylaniline hydrochloride, N,N-diethylaniline hydrochloride, o-ethylaniline hydrochloride, 2,3-dimethylaniline hydrochloride, 2-methyl-6-ethylaniline hydrochloride, 2,6-diisopropylaniline hydrochloride, tribromoaniline hydrochloride, N-ethylaniline hydrobomide, o-phenylenediamine monohydrochloride, o-phenylenediamine dihydrochloride.

3. The process as in claim 1 wherein the catalyst is present in an amount between 2 and 7 percent by weight based on the weight of the binder composition.

4. The process as in claim 1 which additionally comprises heating the catalyzed binder composition to the initiation temperature of the catalyst.

* * * * *

PO-1050
(5/69)

UNITED STATES PATENT OFFICE
CERTIFICATE OF CORRECTION

Patent No. 3,816,375     Dated   July 11, 1974

Inventor(s)   Keith B. Bozer and Lloyd H. Brown

It is certified that error appears in the above-identified patent and that said Letters Patent are hereby corrected as shown below:

Column 1, line 61 delete "to"; Column 2, line 1 delete "men" and substitute therefor --then--.

Signed and sealed this 8th day of October 1974.

(SEAL)
Attest:

McCOY M. GIBSON JR.                C. MARSHALL DANN
Attesting Officer                  Commissioner of Patents